June 2, 1931.  K. M. URQUHART  1,808,088
APPARATUS FOR CONTACTING TWO OR MORE FLUIDS
Filed Jan. 29, 1929   3 Sheets-Sheet 2
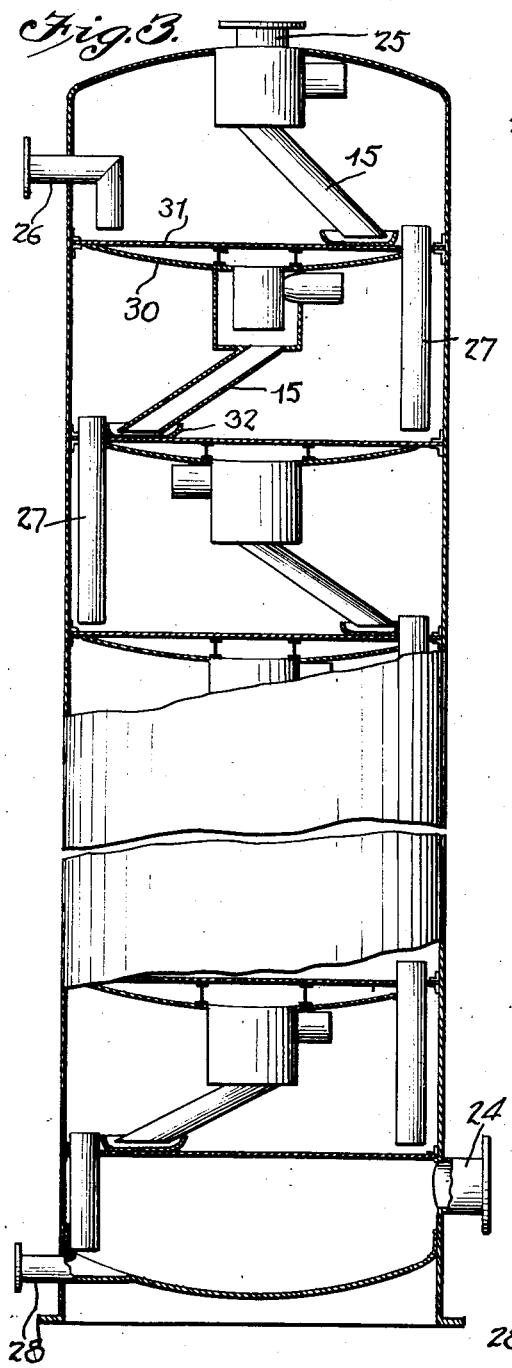
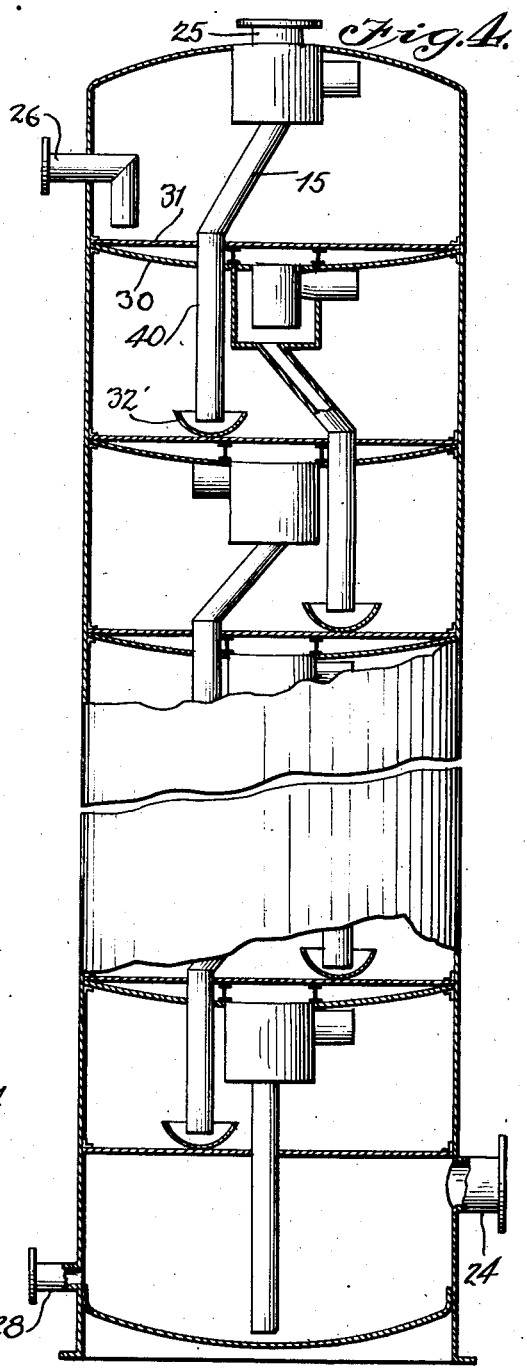
INVENTOR
Kenneth M. Urquhart
BY Percy H. Moon
ATTORNEY.

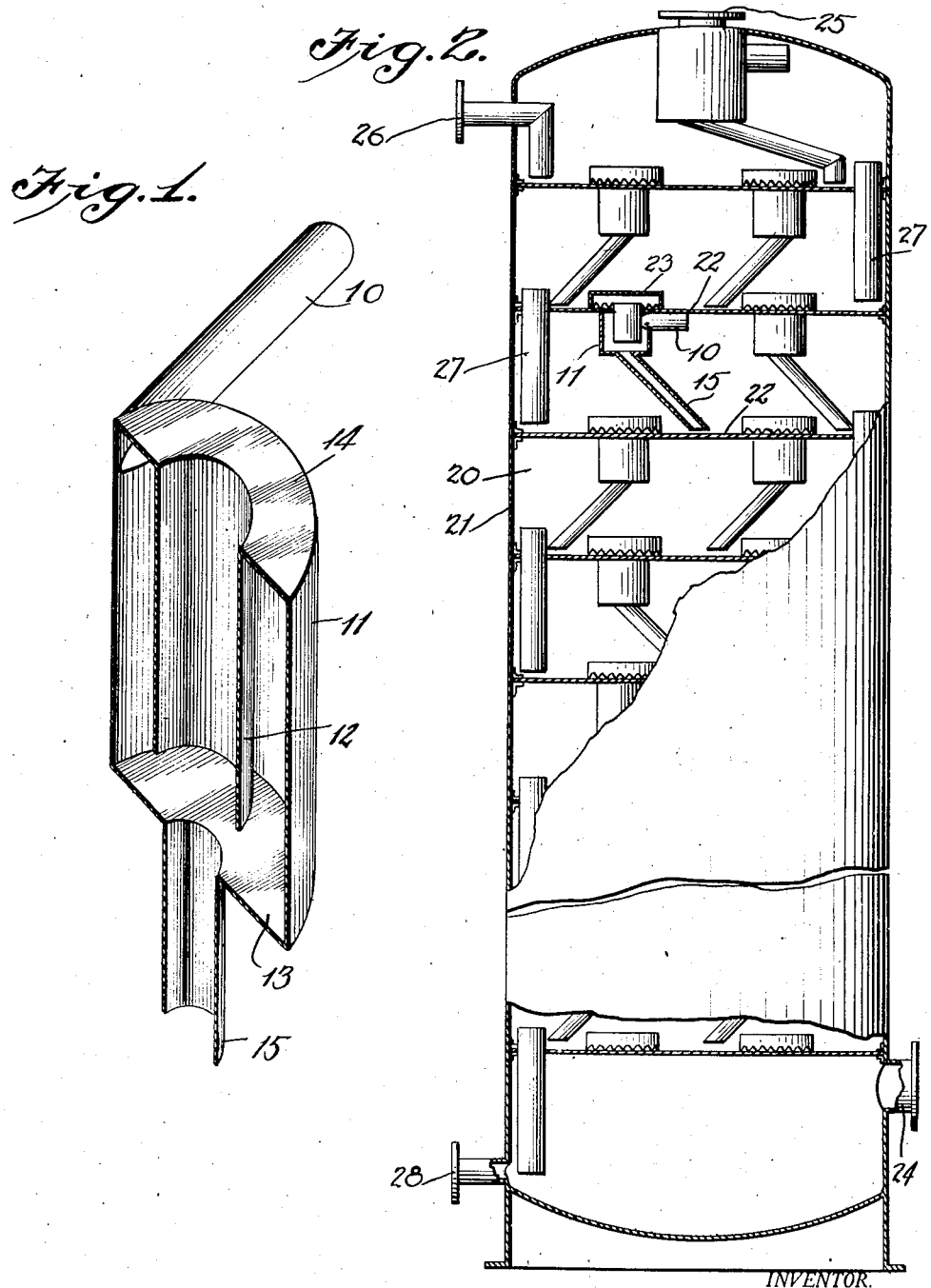

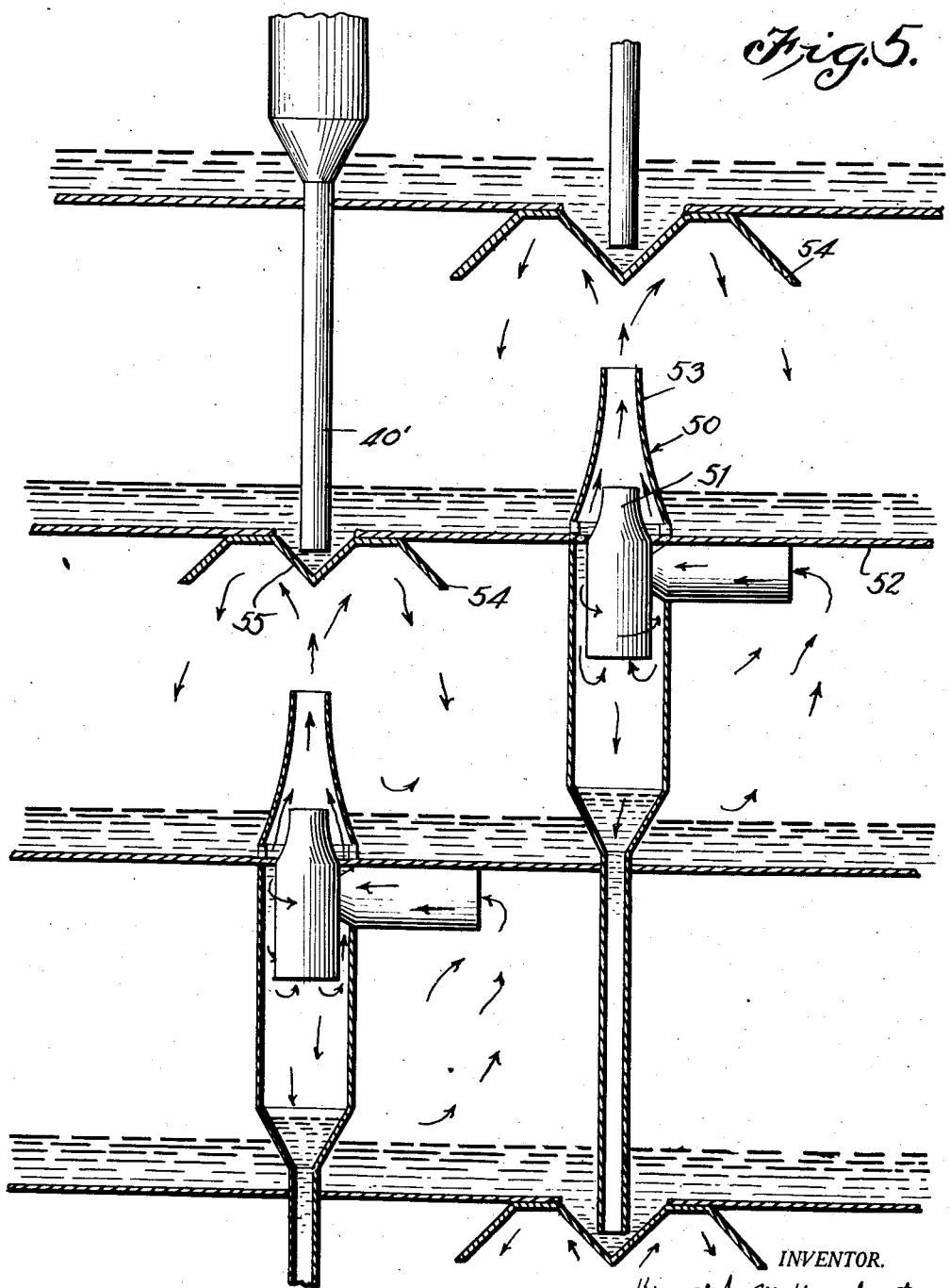

Patented June 2, 1931

1,808,088

UNITED STATES PATENT OFFICE

KENNETH M. URQUHART, OF MARSHALL, OKLAHOMA

APPARATUS FOR CONTACTING TWO OR MORE FLUIDS

Application filed January 29, 1929. Serial No. 335,802.

This invention relates to improvements in devices such as bubble towers which serve as fractionating columns, stills, dephlegmators, chemical treating devices and the like.

One object of the present invention is to facilitate the contact of a gas with a liquid and to make it possible to have a high gas velocity within the apparatus where the contact takes place without causing the liquid to be carried through the apparatus or out of the apparatus by the swiftly flowing gas.

Another object of the present invention is to reduce the resistance to gas flow which is commonly encountered in bubble towers and the like.

A further object of the invention is to obtain a maximum efficiency with a minimum of overhead and operating expense. Further objects will be obvious from the appended disclosure and claims.

The gas velocity through conventional bubble towers is limited to about 60 to 75 feet a minute. In perforated plate towers a gas velocity of 180 feet a minute at atmospheric pressure may be attained. These limits are imposed because of the fact that at higher gas velocities liquid in the form of small droplets or a cloud is carried from a lower level to a higher level or from within the device to out of the device with the flowing gas.

Even with these limitations however, the term "bubble tower" is a recognized misnomer, as the gas does not really bubble up through the liquid in most cases but the liquid in the form of drops and froth is carried up within any one portion of the column and rides the gas so that there is no definite liquid level. The liquid bounces back and forth between the plates as a frothy spray when the tower is operating at full capacity.

My invention to be described below is suited for very high gas velocities. Separators are placed between the pans so that the liquid which is whipped into a frothy spray by the rushing gas is separated from the flowing gas before the same reaches the next compartment. The gas which has been freed from the liquid in one compartment may be admitted into the next compartment through nozzles, perforated plates, screens and the like, where again the frothy mass is whipped up and again separated before the gas passes on to the third compartment.

When a conventional bubble tower is operating at moderate capacity a high resistance to gas flow is encountered due to the head of liquid resisting the flow of gas. As the flow increases this gradually breaks up so that the resistance to flow is merely that of fluid resistance or friction through the tower, rather than the static resistance of a given head of liquid on each pan. It is thus seen that less head loss is encountered when a tower is operated at such capacity that the liquid is finely broken up and is floated between the plates.

By the use of this invention it is possible to keep the liquid floating between the plates without the danger and annoyance of liquid carrying over to any appreciable extent, and the range of velocities possible with my device is much greater than with conventional devices, and at the same time the tower may be so designed that velocities lower than those normally used may be successfully used without great static resistance, as well as velocities far higher than is practical with the present devices.

In order to make this invention so clear that anyone skilled in the art may practice the same I have used certain figures to illustrate some embodiments of it, as follow:

Figure 1 represents a type of separator which is very well suited to the practice of this invention but which may be varied in exact form to suit the conditions.

Figure 2 illustrates a conventional tower fitted with separators swung under each plate.

Figure 3 illustrates a modification of Figure 2 wherein certain advantages later to be described are obtained.

Figure 4 is a modification of Figure 3 where certain additional advantages are found.

Figure 5 is a detailed view of another modification wherein jets are used to mix the gas and liquid.

In Figure 1, 10 is an opening into which gas with entrained liquid enters a cylindrical casing 11 tangentially, where the gas and liquid swirl around, progressing downwardly as they swirl in a spiral. 12 is an inner cylinder stopping short of the base 13 of the cylinder 11 and opening upwardly through the top 14 of cylinder 11. 15 is an outlet for the liquid passing through 13 and ending preferably below a surface of liquid on a plate or in a dish below.

One way in which this type of separator may be used is illustrated in Figure 2, wherein one or more separators are placed beneath each plate so that the liquid within a chamber 20 of a tower 21 enters through the inlet 10, swirls around the cylinder 11 as heretofore described and is released above the plate 22 from which it is swung, into a bubble cap 23 of conventional design. The liquid outlet 15 leads down and stops just short of a plate 22 next below the plate from which the separator is swung, so that the outlet at the lower end of 15 is normally beneath the surface of liquid on the plate. In the operation of this device gas flows in at 24, passes upwardly through the bubble caps and separators and leaves the device through 25. Liquid passes in at 26, overflows through pipes 27 and finally leaves the device at 28.

Figure 3 is a modification wherein instead of using a solid plate with bubble caps covering the opening through which the gas comes there is a dished plate from which the separator is swung and above this is a plate such as a perforated plate which may be of any well known type. The dished plate is shown as 30 and the perforated plate as 31.

In order to provide a level of liquid for the down pipes 15 of the separators a dish 32 is provided, which likewise tends to spread the liquid. The operation of this device is similar to that of Figure 2 except that the gas passes up through the liquid through a perforated plate or screen rather than through bubble caps.

Figures 4 illustrates a device capable of being operated at very high capacity. There are no down pipes for the liquid from one plate to another. The liquid is caught up by the gas in passing through a perforated plate 31, is brought into the separator where the liquid and gas are separated and the down pipe 15 connects to an extension 40 which passes completely through a perforated plate and dished plate and down into a dish 32' upon the plate next below the plate from which the liquid was picked up by the gas. This provides for the progressive down flow of the liquid and allows of a very high velocity of gas.

In this modification there is no down pipe for liquid which has not passed through the separators, and when running at full capacity there would be practically no down flow of liquid except liquid which had been raised as mist or froth and separated in the separators and then passed downwardly. This makes a very efficient type of apparatus in the fact that it can be run at high speed, that the maximum use of heavy fluid is made, and that it becomes actually desirable to have an appreciable formation of droplets or mist.

Figure 5 illustrates a device similar to that shown in Figure 4 except that the contact of the liquid and gas is not made by the flowing of the gas through a perforated plate, but the two are mixed in a device 50 comprising an inner jet 51 opening up through a solid plate 52 from a separator and an outer mixing jet 53 having holes below the surface of liquid on the plate for the entry of liquid around the jet 51. Above the jet upon the base of the nearest plate may be fixed a baffle 54 against which the mixture of liquid and gas is thrown and deflected downwardly, and the center point 55 of the baffle may be made so as to serve as a dish for the down pipe 40' which releases the liquid onto the plate last mentioned. This form also is adapted to very high gaseous velocities and is in general quite efficient.

If desired the form shown in Figure 5 may be varied by having the liquid in one down pipe 40' lead directly into the nozzle of a jet 53, and this would eliminate the necessity for maintaining a level of liquid on a plate.

It will be evident to those skilled in the art that this device might also be used for the contact of liquid and liquid, a heavy liquid might be used by allowing the same to enter through 26 and a light immiscible liquid might be allowed to enter through 24 and the two flow counter in a fashion analogous to that before described. In the treating of petroleum distillate the treating agent is practically always heavier than the distillates. This apparatus would function admirably if the distillate were admitted at 24 and removed at 25, while the treating agent was admitted at 26 and removed at 28.

When the device is to be used for the treatment of such as petroleum oils by solutions in water the preferred form will generally be that shown in Figure 5. When the device is used for the contact of a gas by a liquid containing elements to be absorbed by the gas the preferred form is that shown in Figure 3. If however a high velocity of above 200 feet a minute is desired the preferred form may be that shown in Figure 4.

When the device is used to enrich a gas by a liquid that modification shown in Figure 2 may be found preferable. These preferences and other features will depend upon various circumstances and all of the forms will be found efficacious.

As will be obvious to those skilled in the art many changes may be made in the invention without departing from the spirit thereof, and I do not wish to be limited except as defined by the following claims.

What I have invented and desire to protect by Letters Patent is:

1. A contacting tower having a plurality of plates preventing the free fall of the heavy fluid used in said contracting tower, means above said plates to mix the lighter fluid coming up through said plates with the heavy fluid upon said plates and means below each plate and depending therefrom to separate the heavy and light fluid from the next lower plate, said last named means comprising a centrifugal separator having a tangential inlet below said plate, an outlet through said plate for the lighter fluid and an outlet downwardly going to a point below the surface of the heavier fluid on a plate below.

2. A device as in claim 1 wherein the separating means consists of a cylinder having an inlet through a pipe coming into it tangentially, which pipe is below the plate from which the separator is swung, an inner cylinder within said first named cylinder, said inner cylinder having its upper opening through the aforesaid plate and a lower open end below the tangential inlet into the said first cylinder and an outlet downwardly from the lower end of the first mentioned cylinder through a pipe running to a point on a lower plate where the end of the pipe is below the level of the heavy fluid.

3. A device as in claim 1 wherein the outlet downwardly pierces a plate and deposits the heavier fluid on a plate below the said pierced plate.

In testimony whereof I affix my signature.

KENNETH M. URQUHART.